US009285919B2

(12) United States Patent
Chihara

(10) Patent No.: US 9,285,919 B2
(45) Date of Patent: Mar. 15, 2016

(54) INFORMATION PROCESSING DEVICE, CONTROL METHOD, AND STORAGE MEDIUM

(71) Applicant: CANON KABUSHIKI KAISHA, Tokyo (JP)

(72) Inventor: Yusuke Chihara, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 14/231,173

(22) Filed: Mar. 31, 2014

(65) Prior Publication Data

US 2014/0292728 A1     Oct. 2, 2014

(30) Foreign Application Priority Data

Apr. 2, 2013    (JP) ................................ 2013-076841

(51) Int. Cl.
*G06F 3/041*     (2006.01)

(52) U.S. Cl.
CPC .................................. *G06F 3/0418* (2013.01)

(58) Field of Classification Search
CPC .............................. G06F 3/0418; G06F 3/048
See application file for complete search history.

(56) References Cited

U.S. PATENT DOCUMENTS

| 2003/0132922 A1* | 7/2003 | Philipp | 345/173 |
| 2006/0284855 A1* | 12/2006 | Shintome | 345/173 |
| 2012/0105481 A1* | 5/2012 | Baek et al. | 345/173 |

FOREIGN PATENT DOCUMENTS

| JP | 2009-169820 A | 7/2009 |
| JP | 2012-113745 A | 6/2012 |

* cited by examiner

*Primary Examiner* — Kevin M Nguyen
(74) *Attorney, Agent, or Firm* — Canon USA, Inc. IP Division

(57) ABSTRACT

An information processing device including a control unit reduces an occurrence of a malfunction without changing a layout of a displayed object in a situation where a user supports the information processing device with one hand and performs the touch operation with that hand. The control unit sets a first area and a second area on a screen and senses a position on the screen touched by the user. An operation identified in accordance with the position sensed in the first area is invalidated so as not to be executed in the information processing device if the touch position was sensed in the second area within a predetermined time after the touch position was sensed in the first area.

16 Claims, 13 Drawing Sheets

| AREA ID | FIRST AREA 801 | | | | SECOND AREA 802 | | | |
|---|---|---|---|---|---|---|---|---|
| 800 | X | Y | Width | Height | X | Y | Width | Height |
| ⋮ | ⋮ | ⋮ | ⋮ | ⋮ | ⋮ | ⋮ | ⋮ | ⋮ |
| 0001 | 140 | 220 | 100 | 100 | 140 | 220 | 100 | 100 |
| ⋮ | ⋮ | ⋮ | ⋮ | ⋮ | ⋮ | ⋮ | ⋮ | ⋮ |

| OBJECT ID | DISPLAY POSITION | | | |
|---|---|---|---|---|
| | X | Y | Width | Height |
| ⋮ | ⋮ | ⋮ | ⋮ | ⋮ |
| 0001 | 140 | 220 | 80 | 80 |
| 0002 | 30 | 120 | 40 | 120 |
| 0003 | 0 | 10 | 240 | 20 |
| 0004 | 90 | 185 | 20 | 20 |
| ⋮ | ⋮ | ⋮ | ⋮ | ⋮ |

INFORMATION PROCESSING DEVICE, CONTROL METHOD, AND STORAGE MEDIUM

BACKGROUND OF THE INVENTION

1. Field of the Invention

The present invention generally relates to information processing and, more particularly, to an information processing device, control method, and storage medium for a device operated by touch operation.

2. Description of the Related Art

A device with a graphical user interface (hereinafter referred to as a "GUI") is gaining priority. A GUI allows a user to touch a touchscreen, with a touch sensing function and a display function, to perform operations. The touch screen is hereinafter simply referred to as "screen". Also, in recent years, the touch operation has become common in devices with reduced size and weight such as smart phones and the like. The touch operation is performed through the user's touch (contact) to the GUI object displayed on the screen. The GUI object includes graphics, characters, images and the like. In doing so, the user may support the device and perform the touch operation to touch the screen with one hand. In one-hand operation, mostly, the user supports the device with the palm and performs the touch operation to touch the screen with the thumb. This, however, causes a situation where, as compared to the normal time, the user find it difficult to move the thumb as he intended, since the operation is performed while keeping support of the device. This results in a problem that a malfunction caused by an accidental touch is likely to occur.

To this problem, Japanese Patent Application Laid Open No. 2012-113745 discloses a mobile terminal device, in which position of the base of the finger is identified based on the configuration of the contacting surface made by the user's touch to the screen, and then, the display content of GUI is changed in accordance with the position identified. With this mobile terminal device, the GUI object is not displayed on the area closer to the base of the finger or on the area where is away so that the finger is difficult to reach. Therefore, the user is allowed to operate the GUI in a comfortable position.

Further, Japanese Patent Application Laid Open No. 2009-169820 discloses a mobile terminal, in which, when the user touches a sensor provided on a right edge upper area of the device and a sensor provided on a left edge upper area of the device, the user identifies whether the operation is one-hand operation with the right hand, one-hand operation with the left hand, or operation with both hands. Based on the identification, the display content of the GUI is changed. With this mobile terminal, in a case where, for example, the operation is performed with the right hand, button object is placed facing to the right. Further, in a case where the operation is performed with the left hand, button object is displayed facing to the left. This allows the object to be located in a position closer to the base of the finger, which eliminates the need for forcedly stretching the finger.

A malfunction, which may occur when one-hand operation is performed, is that, when the user tries to touch the GUI object displayed at a position away from the thumb, the skin of the base of the thumb may accidentally touch the screen before the tip of the finger touches the screen. According to the technologies disclosed in Japanese Patent Application Laid Open Nos. 2012-113745 and 2009-169820, this kind of problem can be solved by moving the GUI object at a position closer to the base of the finger. This, however, leaves following problems.

According to the mobile terminal device disclosed in Japanese Patent Application Laid Open No. 2012-113745, since the position of the base of the finger is identified based on the configuration of the contacting surface of the finger, it becomes necessary to update the position information of the base by touching the screen beforehand every time the user changes support state of the device.

Further, according to the mobile terminal disclosed in Japanese Patent Application Laid Open No. 2009-169820, the user is required to set the support state of the device by previously touching the sensor provided at a position away from a position at which the device is held.

SUMMARY OF THE INVENTION

It is a main object of the present disclosure to reduce the occurrence of a malfunction without changing the layout of the displayed object in a situation where the user supports the information processing device with one hand and performs the touch operation with that hand.

The information processing device of the present disclosure is the information processing device which is supported by a user with one hand and which comprises a screen which is operable with a finger of that hand. The information processing device includes a setting unit configured to set a first area and a second area on the screen; a sensing unit configured to sense a touch position on the screen touched by the user; and an invalidation unit configured to invalidate, if the sensing unit sensed the touch position in the second area within a predetermined time after the sensing unit sensed the touch position in the first area, an operation identified in accordance with the touch position sensed in the first area so as not to execute the operation in the information processing device.

According to the present disclosure, it is possible to reduce the occurrence of a malfunction without changing the layout of the displayed object in a situation where the user supports the information processing device with one hand and performs the touch operation with that hand.

Further features of the present disclosure will become apparent from the following description of exemplary embodiments (with reference to the attached drawings).

DESCRIPTION OF THE EMBODIMENTS

First Embodiment

In this embodiment, description is made in a case where the information processing device is applied to a smart phone. In the following, particular example is given for a case where, when browsing Web pages with the smart phone, the user supports the smart phone with only one hand and performs the touch operation to the GUI object with the thumb of that hand. Normally, it is general to perform the touch operation with a tip of a finger. For example, when the user performs one-hand operation with the right hand, there may be a case where, when he tries to touch the GUI object displayed on a position away from the thumb (such as left edge of the screen) with the tip of the thumb, the base of the thumb may accidentally touch the right edge of the screen. In this embodiment, description is made with regard to the example of avoiding the occurrence of a malfunction which is not intended by the user in the information processing device in such a circumstance. Note that, "not intended" includes cases where it is against the intention and where it is without the intention. At this time, it will not be questioned whether the user recognizes the fact that the base of the thumb touched the screen.

Figure 1:
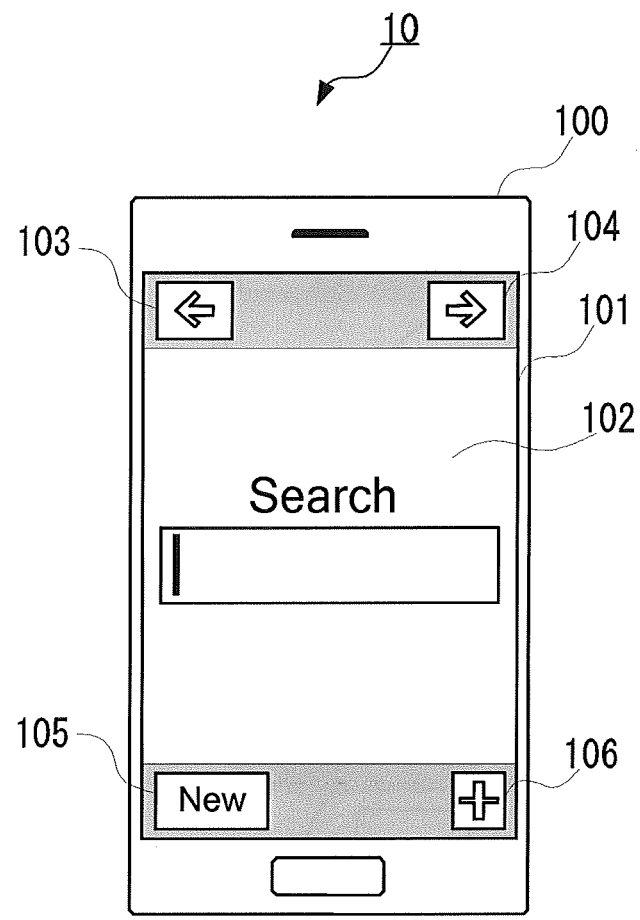
FIG. 1 is a diagram illustrating an example of an appearance of smart phone, which is one example of an information processing device.

FIG. 1 is a diagram illustrating an example of an appearance of the smart phone, which is one example of the information processing device in accordance with the present embodiment. The smart phone 10 mainly comprises a housing 100 and a screen 101 for displaying various GUI objects. Here, the screen 101 serves as a display screen. It also serves as an area subject for touch. The display screen is where to display GUI and the like. The area subject for touch is where is capable of sensing position touched by the user. As shown in FIG. 1, web page display area 102 and various GUI objects such as back button 103, forward button 104, new button 105, and save button 106 are displayed on the screen 101. The back button 103 instructs to move "back" to the Web page previously browsed, starting the Web page currently displayed with reference to the browse history of the Web pages. The forward button 104 instructs to move "forward" to the Web page subsequently browsed, starting the Web page currently displayed with reference to the browse history of the Web pages. The new button 105 instructs to form a new browse area. The save button 106 instructs to save the Web pages currently browsing as a bookmark. As above, triggered by the user's touch operation, processing corresponding to each of the GUI objects is executed.

Figure 2:
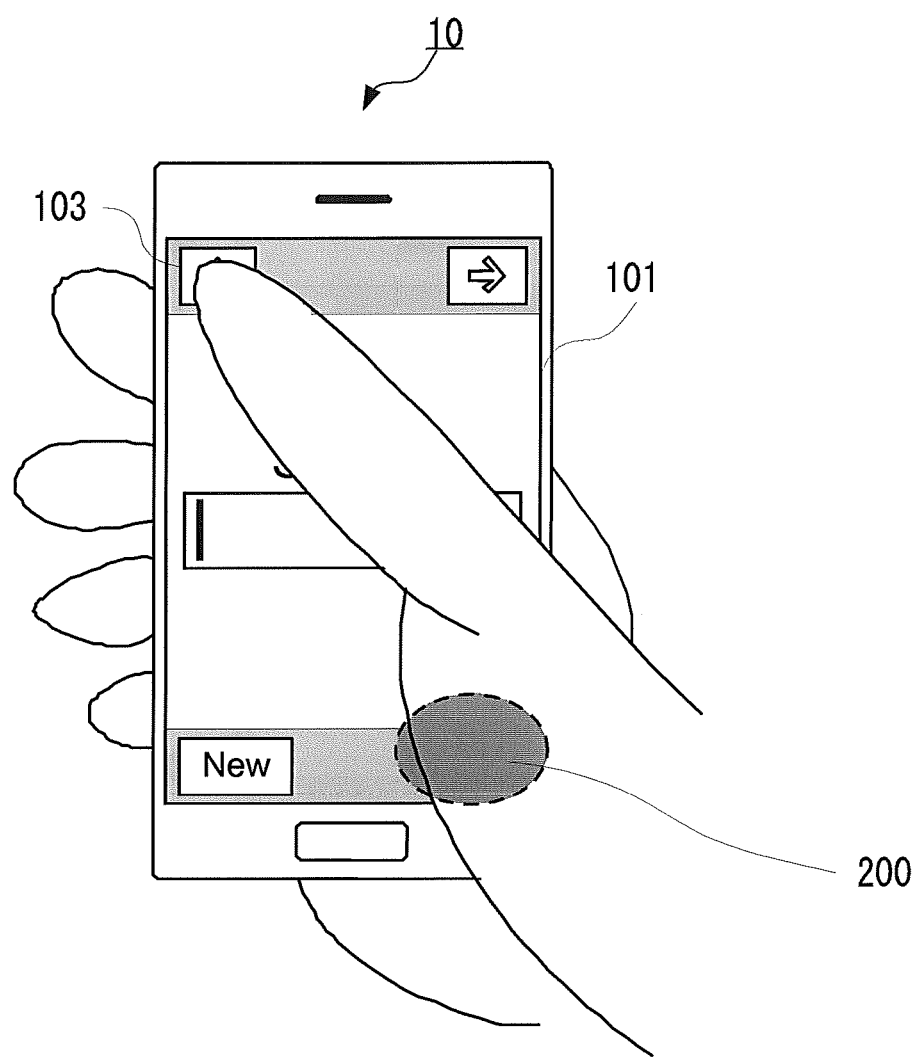
FIG. 2 is a diagram showing a situation where user is supporting the smart phone with the right hand and performing a touch operation to touch back button with the right hand thumb.

FIG. 2 is a diagram showing a situation where the user is performing the touch operation to touch the back button 103 with the tip of the thumb while keep supporting the smart phone 10 with the right hand. The back button 103 is displayed on the left upper area of the screen 101 looking from the front of FIG. 2. When the user moves the tip of the thumb toward the back button 103 for operation, it causes a situation where the thumb is greatly stretched. This may cause, due to the structure of human hand, a situation where the base of the thumb 200 accidentally touches the right bottom area of the screen 101 before the tip of the finger touches the back button 103. Conventionally, in this case, even when the user performs the touch operation to touch the back button 103 with the tip of the finger immediately after this, the processing corresponding to the save button 106 may be performed. At this time, the processing corresponding to the save button 106 may be a malfunction which is not intended by the user. Taking these situation into consideration, in this embodiment, in order to solve the problem, when the touches to any specified area are consecutively occurred within a predetermined holding time, touches to some areas on the screen 101 are invalidated.

Figure 3:
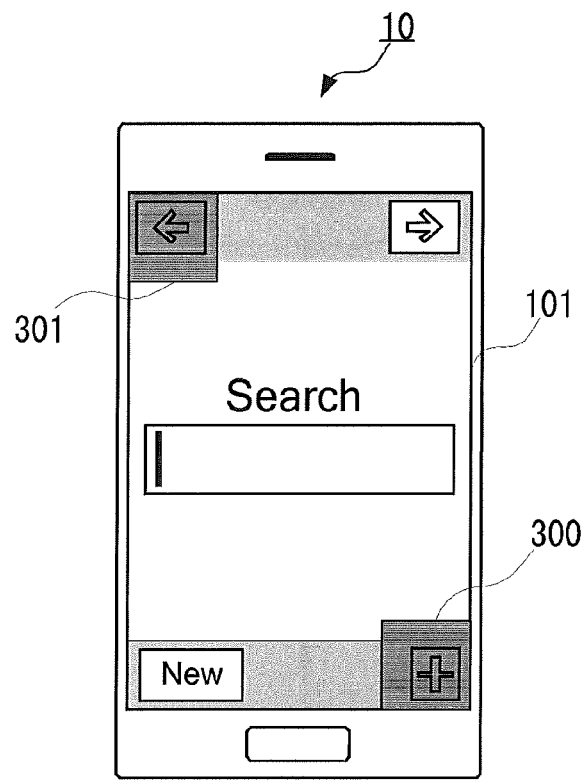
FIG. 3 is a diagram illustrating one example of areas set on a screen.

FIG. 3 is a diagram illustrating one example of areas set on the screen 101, in which two event areas comprising of first area 300 and second area 301 are set. The first area 300 represents the area where the touch to cause a malfunction which is not intended by the user is likely to be sensed in a case where the user supports the information processing device with one hand and performs operation with that hand. Thus, the area is where the user's base of the thumb is apt to accidentally touch. As above, in this embodiment, in particular, a malfunction, which may be caused in a situation where, when the user tries to touch the intended GUI object with the tip of the thumb, the base of the thumb may accidentally touch the screen before the tip of the thumb touch the screen, is prevented. In a situation where the user is supporting the information processing device with the right hand, no matter how the user moves the tip of the thumb, the movement amount of the base of the thumb is small. Therefore, it can be said that it is the right bottom area of the screen where the base of the right hand thumb 200 is assumed to touch. Thus, in this embodiment, as illustrated in FIG. 3, the first area 300 is set on the right bottom area of the screen 101, taking the position of the base of the right hand thumb into consideration. Note that, as long as the first area 300 includes the area for sensing the touch operation for the save button 106, the first area 300 does not have to be matched with the area where the save button 106 is provided. On the other hand, the second area 301 represents the area where the user is likely to touch with intention for operation in a case where the touch to cause a malfunction which is not intended by the user is sensed in the first area 300. In this embodiment, the second area 301 is, in a situation where the base of the thumb touches the first area 300, where the tip of that thumb may touch or may try to touch. In this embodiment, the second area 301 is set to include movement limit position of the tip of the thumb used for the touch operation. It means that, the second area 301 is set to include area on the screen 101 where allows the user's touch operation if he greatly stretches the thumb. In the particular example of FIG. 3, when performing the touch operation to touch the back button 103, taking into consideration of the fact that the user may greatly stretch the thumb, the second area 301 is set on the left upper area of the screen 101 including the back button 103.

The first area 300 and the second area 301 are set as a paired area where the first area 300 is associated with the second area 301 as pair. This means that the area where the user is about to touch with intention and the area where the user may accidentally touch in doing so are paired. Note that, plural pairs of the first area and the second as associated may be set on the screen 101. For example, assuming a case where the user greatly stretches the thumb in lateral direction, the first area may be added on the right bottom area of the screen 101 and the second area may be added on the left bottom area of the screen 101.

In this embodiment, instead of immediately executing the processing corresponding to the GUI object identified by the touch operation to the first area 300, the smart phone 10 stores information indicating that the GUI object was touched. The stored information indicating that the object in the first area 300 was touched is hereinafter referred to as touch information.

The touch information in this embodiment is the information including touch event and coordinates representing the position on the screen 101 at which the touch was sensed. Detailed explanation will follow later. The touch event includes touchdown and touchup. The touchdown indicates that the user touches the screen 101. The touchup indicates that the user released his finger from the screen 101. In accordance with the coordinate information included in the touch information and the information of displayed image displayed on the screen, it is possible to identify the GUI object touched.

Then, when a touch was sensed in the second area 301 as a following touch operation within a predetermined time from the touch operation to the first area 300, the following touch operations to the first area 300 are invalidated and the touch information as previously stored is discarded. It means that, when the touch operation is invalidated, the touch information sensed and stored is also removed. The predetermined time is referred to as "holding time". Here, invalidation represents a situation where does not reflect the information on the touch sensed within the area to the operation of the information processing device. Then, when the touch operation to the first area 300 is stopped, that is, when it was sensed that the user's finger was released from the screen 101 (when the touch operation with the touch event of "touch up" was sensed), the touch operation in the first area 300 is validated again. "To validate" means to accept the input by the touch operation. Further, when the subsequent touch operation was not performed in the second area 301 within a predetermined time from the touch operation in the first area 300, the processing of the GUI object identified in accordance with the touch information as previously stored is executed. For example, a case where the user touches up the first area immediately after he touched down the first area will not satisfy the above requirement so that the processing is executed immediately after the touchup.

Note that, in this embodiment, description is made in a case where the holding time is set to be 500 milliseconds.

Due to the processing as above, even in a case where the base of the thumb 200 accidentally touched the screen 101 before it touches the back button, if the tip of the finger touches the back button 103 within 500 milliseconds, the touch operation to the save button 106 is invalidated. Therefore, just as the user intended, the processing of the back button 103 is executed. Then, when the base of the thumb 200 is released from the screen 101, the touch operation to the first area 300 is validated again, which, thereafter, allows to continue normal touch operation.

The particular component for realizing these functions and control processing procedure will be described in detail.

Figure 4:
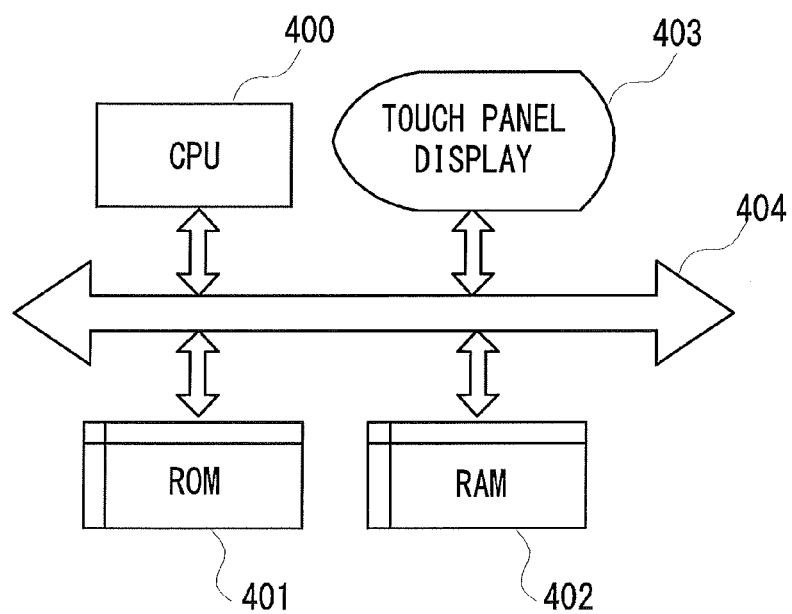
FIG. 4 is a diagram illustrating an example of main hardware configuration of the smart phone.

FIG. 4 is a diagram illustrating an example of main hardware configuration of smart phone 10. The smart phone 10 is comprised of central processing unit (CPU) 400, read only memory (ROM) 401, random-access memory (RAM) 402, touch panel display 403, and system bus 404. The CPU 400 executes computing or logic determination for various processing and processing based on a program for displaying GUI. Also, the CPU 400 controls operation of each component element connected to the system bus 404. The ROM 401 stores various computer programs for the processing as mentioned or basic input/output (I/O) executed with the CPU 400, information on the GUI object (such as display position or size) and area information as mentioned. The RAM 402 is a work area for the CPU 400, in which rewritable data to temporally or permanently be saved is stored. Further, the touch panel display 403 corresponds to the screen 101, which displays various GUI objects or outputs touch information in accordance with the user's touch operation.

Figure 5:
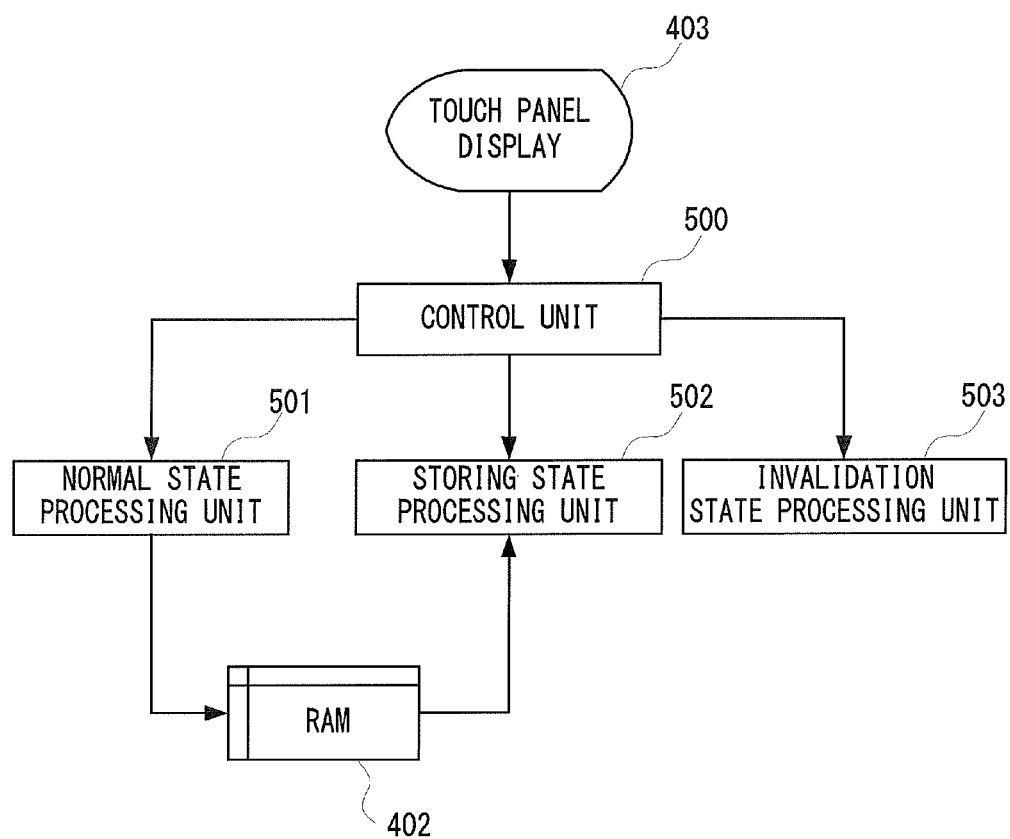
FIG. 5 is a diagram illustrating an example of a functional block of the smart phone.

FIG. 5 is a diagram illustrating a functional block of the smart phone 10. The smart phone 10 is comprised of the touch panel display 403, which acts as the screen 101, the RAM 402, control unit 500, normal state processing unit 501, storing state processing unit 502, and invalidation state processing unit 503. The control unit 500 receives the touch information output from the touch panel display 403 and determines the following processing depending on the internal state, which will be described later. As used herein, the term "unit" generally refers to any combination of software, firmware, hardware, or other component that is used to effectuate a purpose.

The control unit 500 acts as a first sensing means and the second sensing means. The first sensing means senses the user's touch operation to the first area 300. The second sensing means senses the user's touch operation to the second area 301. Further, the control unit 500 acts as a setting means for setting the first area 300 and the second area 301.

The normal state processing unit 501 mainly determines whether or not the user's touch operation is included in the first area 300. Depending on the result, the normal state processing unit 501 stores the touch information in the RAM 402. The storing state processing unit 502 mainly determines whether or not to invalidate the touch operation to the first area 300. Depending on the result, the storing state processing unit 502 refers the touch information stored in the RAM 402 or discards the touch information stored in the RAM 402. The invalidation state processing unit 503 mainly determines whether or not to validate again the touch operation to the first area 300. The storing state processing unit 502 and the invalidation state processing unit 503 act, when cooperating together, as invalidation means. As above, there are three internal states, including "normal state", "storing state", and "invalidation state".

Figure 6:
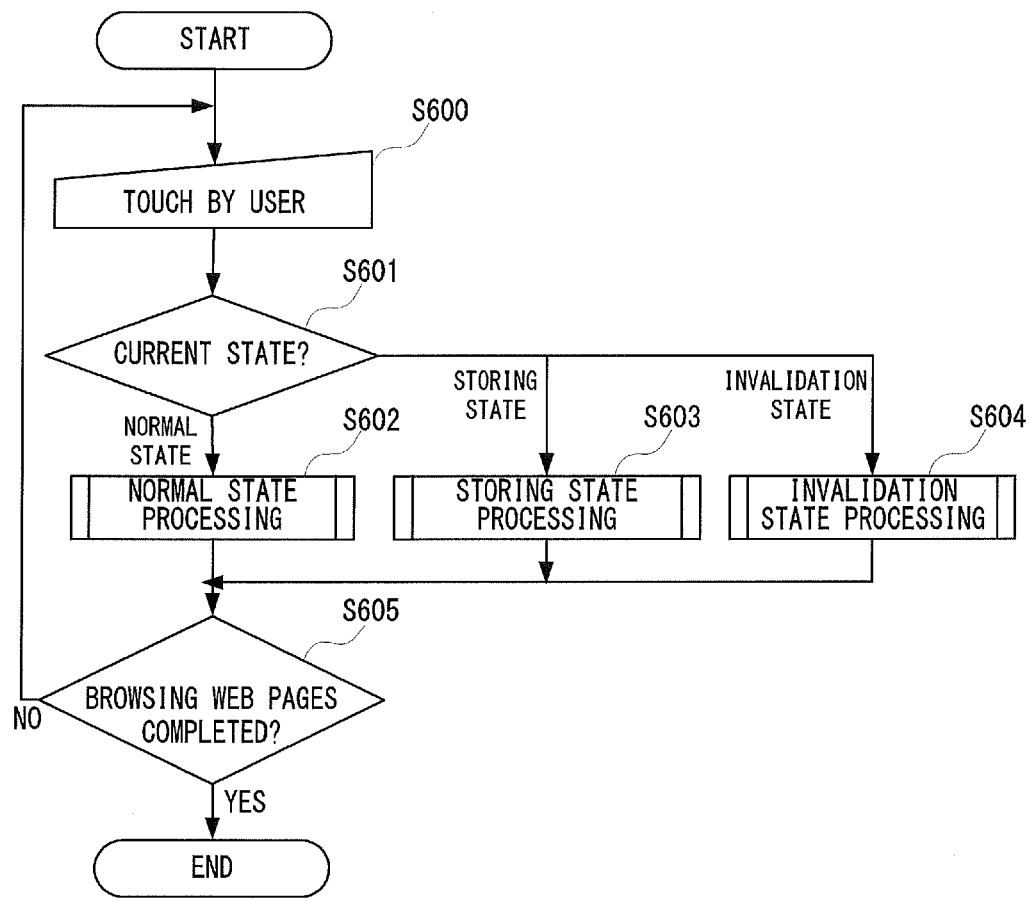
FIG. 6 is a flowchart representing a main control processing procedure of the smart phone.

FIG. 6 is a flowchart representing a main control processing procedure of the smart phone 10. The control processing is executed in the control unit 500. Note that, by the time the processing is started, activation and default setting of the smart phone 10 shall be completed. In this embodiment, the flowchart in FIG. 6 is started in accordance with the execution of the predetermined application based on the user's operation. Here, the predetermined application is regarded (but not limited) to be a browser application for browsing Web pages.

Triggered by the user's touch operation, the control unit 500 acquires the touch information from the touch panel display 403 (step S600). Then, determination is made with respect to the current internal state (step S602). If the current state is determined to be the "normal state", the processing moves to the normal state processing (step S602). Further, if the current state is determined to be the "storing state", the processing moves to the storing state processing (step S603). If the current state is determined to be "invalidation state", the processing moves to the invalidation state processing (step S604). Detailed description will follow later as to each processing from steps S601 to S603. Note that, the "normal state" is the default.

After the end of each processing, the control unit 500 determines whether or not to finish browsing the Web pages (step S605). In a case where instruction to finish browsing is given by, for example, finishing the application by the user's operation, a series of processing is ended. On the other hand, in a case where instruction to finish browsing is not given (step S605), the processing goes back to step S600.

Figures 7, 8:
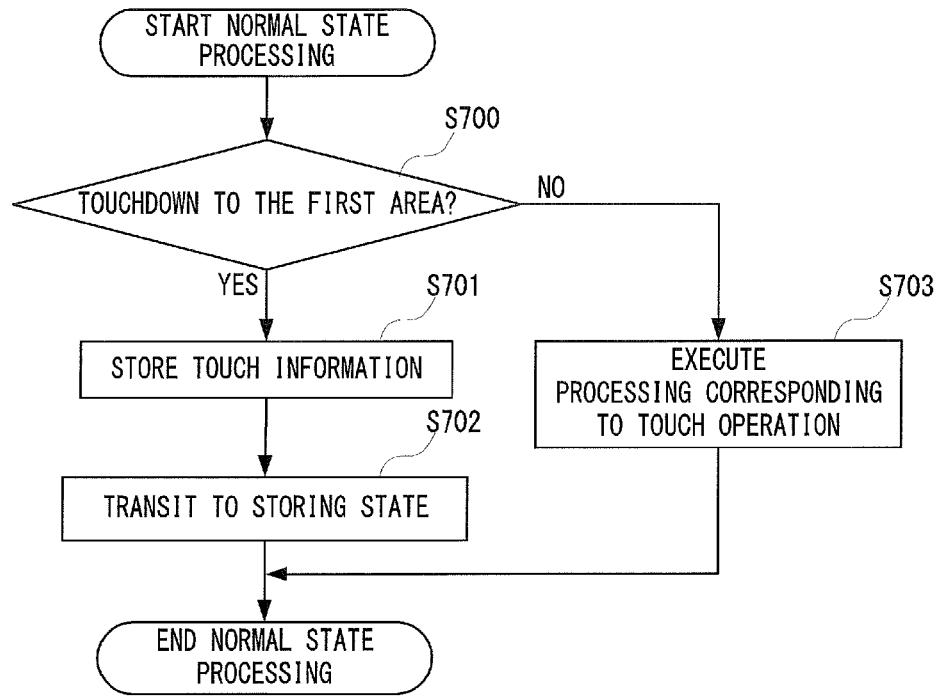
FIG. 7 is a flowchart representing one example of normal state processing of first embodiment.
FIG. 8 is a diagram illustrating one example of data structure of area information.

FIG. 7 is a flowchart representing one example of the normal state processing. The processing is executed in the normal state processing unit 501. FIG. 8 is a diagram illustrating one example of data structure of area information. Description is made with regard to the processing procedure of the normal state processing with reference to FIGS. 7 and 8.

The normal state processing unit 501 determines whether or not the user's touch operation is the touchdown to the first area 300 (step S700).

Here, the area information stored in the ROM 401 is referred when determining whether the user's touch operation is included in the first area 300. In the area information as shown in FIG. 8, a unique number is allocated to area identifier (ID) 800 to the pair of the first area 300 and the second area 301. Further, coordinate information is stored in the first area information 801 and the second area information 802 for respectively identifying the first area 300 and the second area 301. In this embodiment, the first area 300 and the second area 301 have rectangular shape. Therefore, the coordinate information is comprised of the information on x coordinate, y coordinate, width and height of the rectangular. The fact of whether or not the user's touch operation is included in the first area 300 is determined by comparing the coordinates representing the touch position with all first area information 801 stored in the ROM 401. Note that, it is possible to optionally set the pair of the first area 300 and the second area 301. For example, plural pairs of the paired first area 300 and second area 301 may be stored.

Back to FIG. 7, if it is determined that the user's touch operation is the touchdown to the first area 300 (step S700: YES), the normal state processing unit 501 stores the information on the touch operation (touch information) in the RAM 402 (step S701). The information on the touch operation includes, in addition to the touch event input by the control unit 500 (that is, touchdown) and the coordinates, time information indicating when the touch operation was performed and the area ID 800. Then, the normal state processing unit 501 changes the internal state to the "storing state" (step S702).

On the other hand, if it is determined that the user's touch operation is not the touchdown to the first area 300 (step S700: NO), the normal processing unit 501 executes the processing corresponding to the touch operation, for example, the processing of the GUI object touched (step S703).

Figure 9:
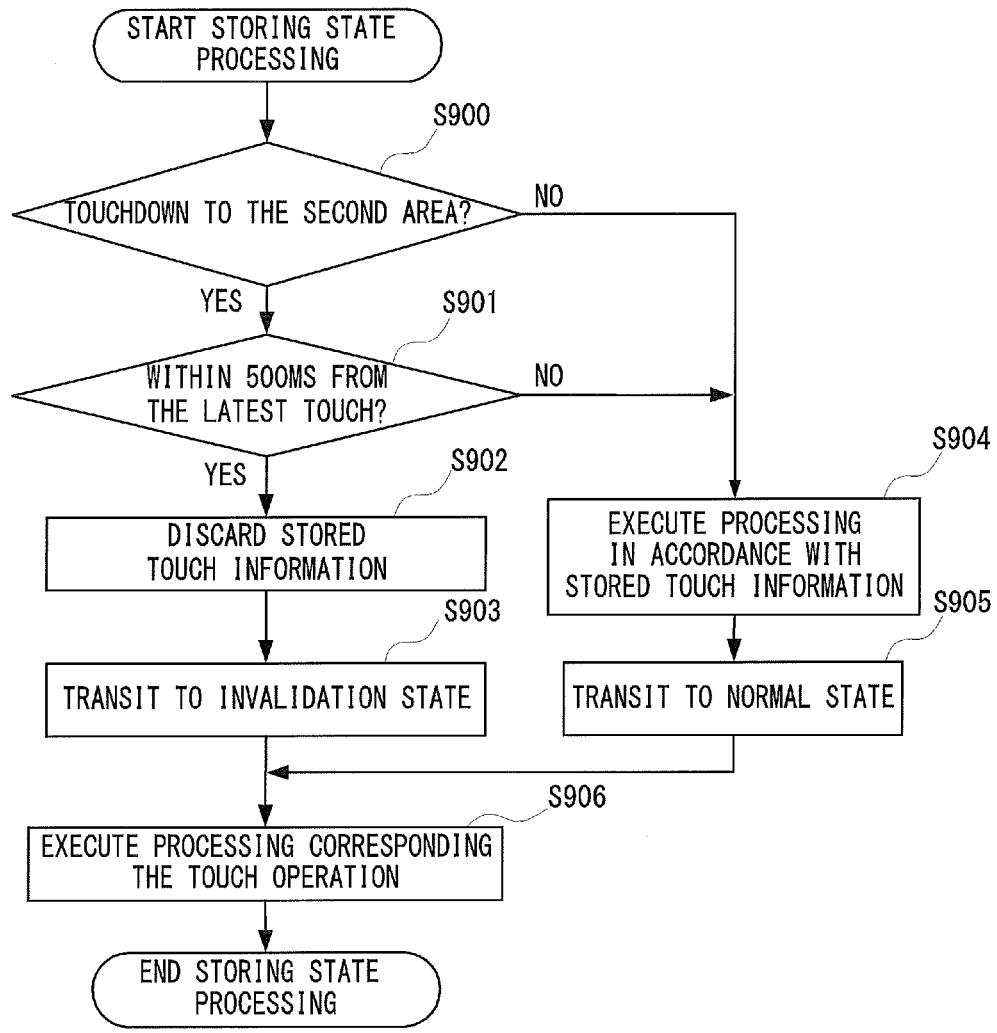
FIG. 9 is a flowchart representing one example of storing state processing.

FIG. 9 is a flowchart representing one example of the storing state processing. The processing is performed in the storing state processing unit 502. Description is made with regard to the processing procedure of the storing state processing with reference to FIG. 9.

The storing state processing unit 502 determines whether the user's touch operation is the touchdown to the second area 301 (step S900). For this determination, similar to the processing in step S700, the area information as shown in FIG. 8 is referred. Further, the storing state processing unit 502 determines, with reference to the touch information stored in the processing of step S701, the presence or absence of the information on the coordinates of the touch position from the second area information 802 corresponding to the stored area ID 800.

If it is determined that the user's operation is the touchdown to the second area (step S900: YES), the storing state processing unit 502 determines whether or not the elapsed time from the latest touch operation is within 500 milliseconds (step S901). This determination is made with reference to the current time and the time information on the touch information stored in the RAM 402. If the elapsed time is determined to be within 500 milliseconds (step S901: YES), the storing state processing unit 502 discards the stored touch information (step S902) and changes the internal state to the "invalidation state" (step S903).

On the other hand, if it is determined that the user's operation is not the touch to the second area 301 (step S900: NO), the storing state processing unit 502 executes the processing in accordance with the stored touch information (step S904). Further, if it is determined that the elapsed time from the latest touch operation is not within 500 milliseconds, the storage state processing unit 502 executes the processing in accordance with the stored touch information (step S904). Then, the storing state processing unit 502 changes the internal state to the "normal state" (step S905).

The storing state processing unit 502 then executes the processing corresponding to the touch operation, regardless of the determination results at steps S900 and S901 (step S906), and then, ends a series of processing.

Figure 10:
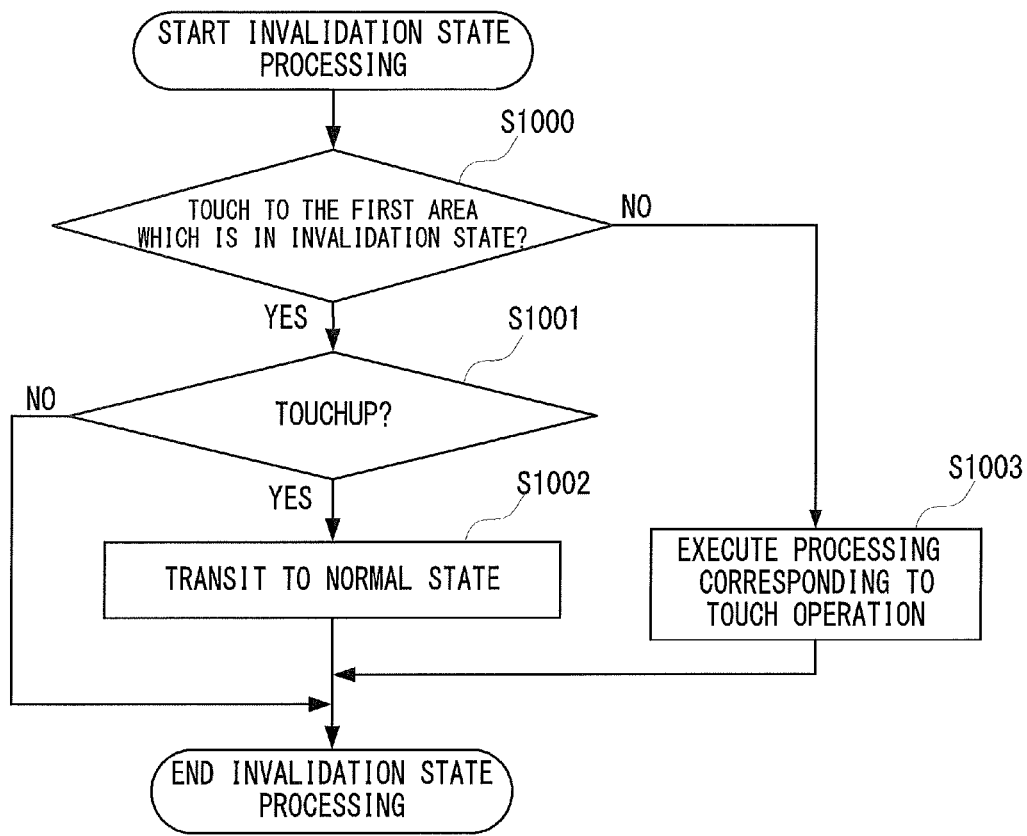
FIG. 10 is a flowchart representing one example of invalidation state processing.

FIG. 10 is a flowchart representing one example of invalidation state processing. The processing is performed in the invalidation state processing unit 503. Description is made with regard to the processing procedure of the invalidation state processing with reference to FIG. 10.

The invalidation state processing unit 503 determines whether or not the user's touch operation is the touch to the first area 300 which is in the invalidation state (step S1000). For this determination, similar to the processing at step S900, the area information as shown in FIG. 8 and the area ID 800 included in the stored touch information are referred. Further, the invalidation state processing unit 503 determines the presence or absence of the information on the coordinates of the touch position from the first area information 801 corresponding to the area ID 800.

If the user's touch operation is determined to be the touch operation to the first area 300, which is in the invalidation state (step S1000: YES), the invalidation state processing unit 503 determines whether or not it is the touchup (step S1001). If it is determined to be the touchup (step S1002: YES), the invalidation state processing unit 503 changes the internal state to the "normal state" (step S1002) and ends the invalidation state processing.

On the other hand, if it is determined not to be the touchup (step S1002: NO), the invalidation state processing unit 503 executes no processing (that is, ignores this touch operation) and ends the invalidation state processing. Further, if the user's touch operation is determined not to be the touch to the first area 300 (step S1000: NO), the invalidation state processing unit 503 executes the processing corresponding to the touch operation (step S1003). Then, the invalidation state processing unit 503 ends a series of processing.

As above, in this embodiment, when the user's touch operation was sensed in the second area 301 within a predetermined holding time after the user's touch operation was sensed in the first area 300, the following user's touch operations in the first area 300 are ignored. This enables to reduce the occurrence of a malfunction caused when the user's base of the finger 200 touches the screen 101 without intention. Also, since the user does not need to previously set how to hold the smart phone 10, it is possible to reduce the occurrence of a malfunction without putting the user any extra time for setting.

Further, since it is not necessary to equip any sensors for detecting the support state of the smart phone 10, it is possible to deter the increase of manufacturing cost.

Note that, it is possible to configure such that the processing for invalidating the touch operation is performed only when the GUI object is included in the first area 300 or when the GUI object is included in both the first area 300 and the second area 301. This enables to reduce the processing load on the smart phone 10 in a case where no malfunction occurs even the base of the finger touches the screen 101 or in a case where there is no opportunity of performing the touch operation with the finger greatly stretched.

In the first embodiment, description is made in a case where the information processing device is applied to the smart phone 10. Not limited to this, the information processing device can be applied to the devices other than the smart phone. Similarly, the application of the information device is not limited to the display mode of the GUI and browsing Web pages. Further, in the first embodiment, example of setting the first area 300 on the right bottom area of the screen 101 and setting the second area 301 on the left upper area of the screen 101 was given. The position, size and shape of the region, however, can optionally be set in accordance with the feature of the device implemented. Further, in this embodiment, example was given in a case where the holding time from the touch operation to the first area 300 to the occurrence of the touch operation in the second area 301 is set to be 500 milliseconds. The holding time can optionally be set in accordance with the feature of the device implemented, for example, the response feature of the touch panel. Note that, in this embodiment, example was given to the base of the thumb 200 as a portion of the hand which may accidentally touch the screen, however, this does not limit the portion of the user's hand with respect to the embodiment. Depending on the design of the information processing device, accidental touch caused by the different portion of the finger may occur. In this embodiment, even in that case, by setting the appropriate areas, a malfunction can be reduced.

Second Embodiment

In this embodiment, description is made with regard to the embodiment in which display determination processing is added to the normal state processing of step S602 (FIG. 6) as described in the first embodiment. The display determination processing is to determine whether or not the GUI object is displayed on the first area 300.

Note that, description is omitted for parts overlapping with the above-mentioned smart phone 10 of the first embodiment, such as hardware configuration, functional blocks, and procedure for control processing other than that of the normal state processing.

Figure 11:
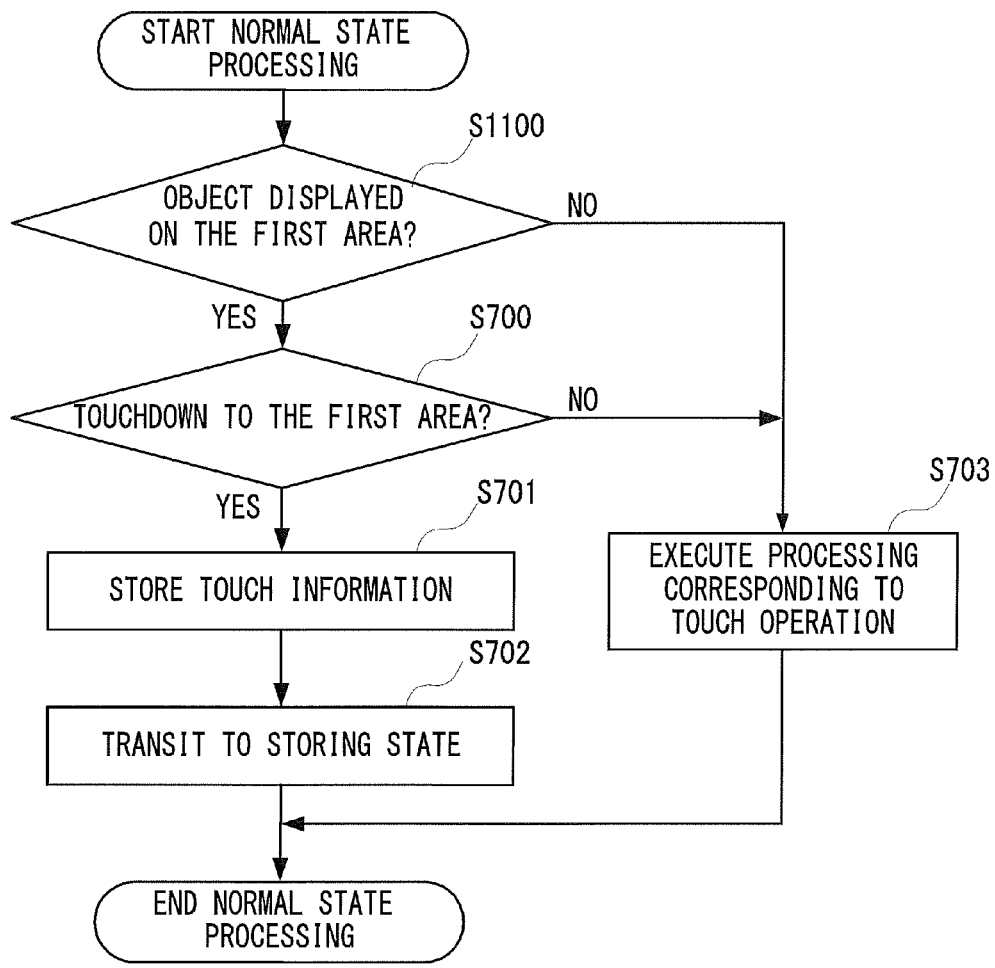
FIG. 11 is a flowchart representing one example of normal state processing of second embodiment.
Figure 12:
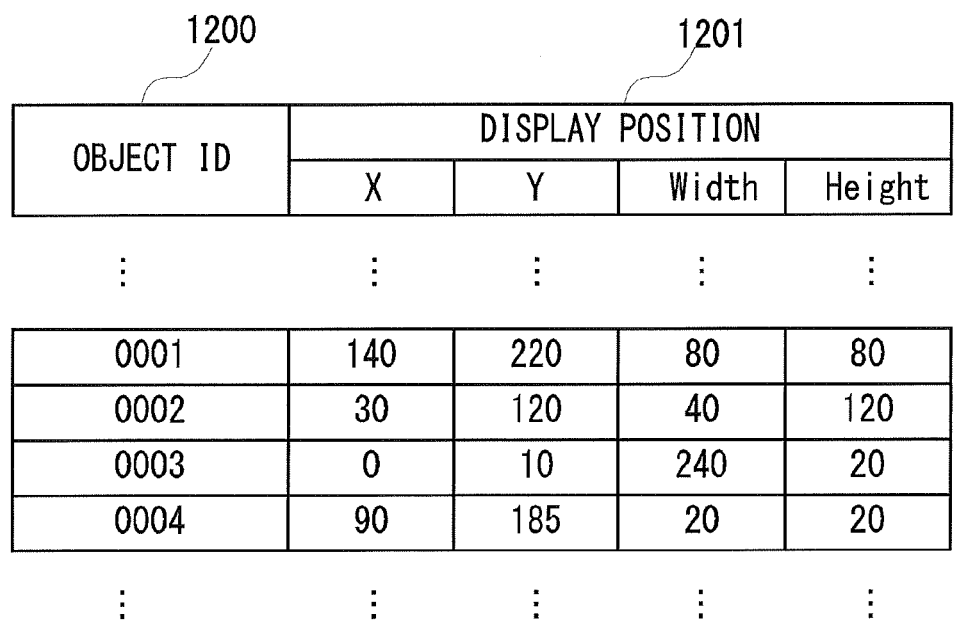
FIG. 12 is a diagram illustrating one example of data structure of display position information of GUI object.

FIG. 11 is a flowchart representing one example of the normal state processing of the embodiment. FIG. 12 is a diagram illustrating one example of the data structure showing a display position information of the GUI object. Description is made with regard to the normal state processing of this embodiment with reference to FIG. 11 and FIG. 12.

The normal state processing unit 501 executes the display determination processing for determining whether or not the object is displayed on the first area 300 (step S1100).

The display determination processing refers to the display position information of the GUI object stored in the ROM 401. As shown in FIG. 12, IDs for uniquely identifying the GUI object displayed on the display screen are allocated to the object ID 1200 of the display position information. The display position information 1201 stores information on x coordinate, y coordinate, width and height of the circumscribed rectangle where the GUI object is displayed. In the display determination processing, comparison is made with the display position information 1201 and all pairs of the first area information 801 as shown in FIG. 8. Then, in a case where the GUI object is found to be included in the first area 300, it is determined to be "true".

Back to FIG. 11, in a case where the GUI object is included in the first area 300 (step S1100: YES, "true"), the normal state processing unit 501 thereafter executes the processing similar to those executed in the normal state processing of the first embodiment (from step S700 to step S703, FIG. 7)

In a case where the GUI object is not included in the first area 300 (step S1100: NO), regardless of whether or not the touch position is included in the first area 300, the normal state processing unit 501 executes the processing corresponding to the touch operation (step S703).

As above, in this embodiment, in a case where place, the GUI object is not included in the first area 300 from the beginning, the processing is executed so as not to allow the internal state of the smart phone to change to the "storing state". This enables to avoid a situation where the state is unnecessarily changed to the storing state processing or invalidation processing. Also, no touch information is stored. These allow to reduce any load on the processing.

Note that, description was made with respect to the example of determining the presence or absence of the GUI object in the first area 300. The example also applies to a case of determining the presence or absence of the GUI object in the second area 301. In particular, in the processing of step S1100, comparison may further be made with the display position information 1201 and the second area information 802. This enables to configure such that the touch information is stored only when the GUI object is found to be included in both the first area 300 and the second area 301, which allows further reduction of the load on the processing.

Variation 1

In the first embodiment, description was made with respect to the example of setting the first area 300 on the right bottom area of the screen 101 and the second area 301 on the left upper area of the screen 101, assuming that the user makes the touch operation with the right hand.

Here, description is made with respect to a case where the user also supports the device and performs the touch operation with the left hand. Note that, as previously described, it is possible to store plural pairs of paired first area 301 and second area 301. Further, description is omitted for parts overlapping with the above-mentioned smart phone 10 of the first embodiment, such as hardware configuration, functional blocks, and procedure for control processing other than that of the normal state processing. Note that, in the following descriptions concerning other variations, description is omitted for the overlapping parts.

Figure 13:
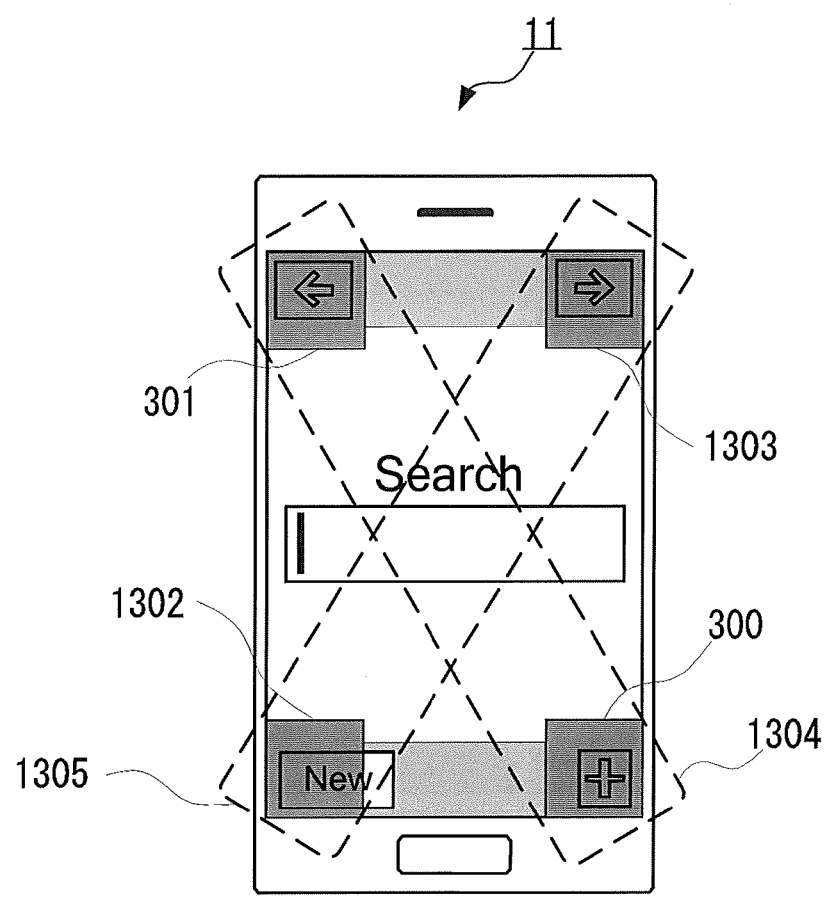
FIG. 13 is an explanatory diagram showing a situation where plural areas are set on screen.

FIG. 13 is an explanatory diagram showing a situation where plural pairs of the paired areas are set on the screen. The first area 300 for the right hand operation and the second area 301 for the right hand operation are set on the smart phone 11 of FIG. 13. Further, the first area 1302 for the left hand operation and the second area 1303 for the left hand operation are set. Also, the data structure of the area information as shown in FIG. 8 stores the combined information of the area 1304 for the right hand operation and the area 1305 for the left hand operation.

This enables to reduce the occurrence of a malfunction caused in the area 1304 for the right hand operation when supporting the smart phone 11 with the right hand. This also enables to reduce the occurrence of a malfunction caused in the area 1305 for the left hand operation when supporting the smart phone 11 with the left hand.

Variation 2

Some information processing devices change, when the user changes how to hold the device, the display mode of the GUI object in accordance with the change of user's how to hold the device. For example, the display mode of the touch panel display 403 when it is supported perpendicular to the longitudinal direction is called "portrait mode". Also, the display mode of the touch panel display 403 when it is supported in a horizontal longitudinal direction is called "landscape mode". In particular, in the "portrait mode", the GUI object is displayed in the display mode according to the vertically long screen. Also, in the "landscape mode", the GUI object is displayed in the display mode according to the laterally long screen. As above, the display mode is changed according to the mode.

Figure 14A:
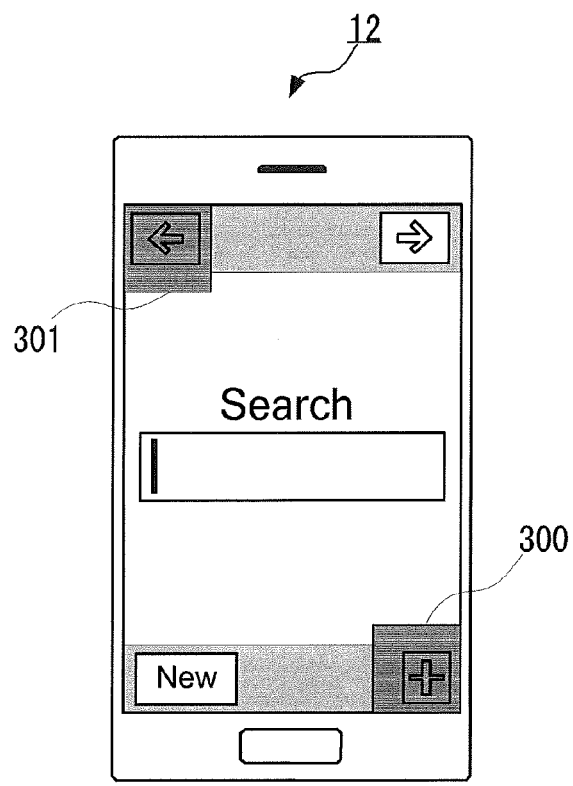
FIG. 14A is a diagram illustrating an example of area setting when it is in "portrait mode"
Figure 14B:
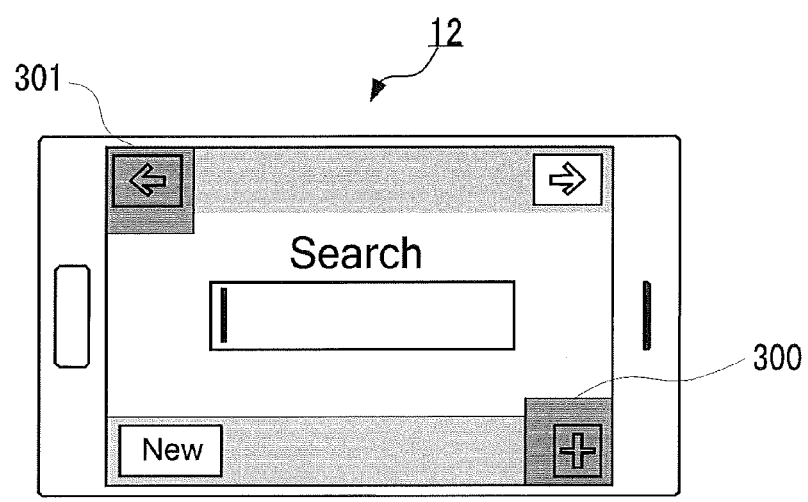
FIG. 14B is a diagram illustrating an example of area setting when it is in "landscape mode".

Description is made in a case where the first area 300 and the second area 301, which are set with respect to the screen, are changed when a way of holding the smart phone is changed from the "portrait mode" to the "landscape mode" with FIGS. 14A and 14B.

FIG. 14A is a diagram illustrating a situation where the settings of the first area 300 and the second area 301 are changed when the way of holding the smart phone 12 is changed, for example, from the "portrait mode" to the "landscape mode". FIG. 14A shows the first area 300 and the second area 301 set on the screen when the user supports the smart phone 12 in the "portrait mode". FIG. 14B shows the first area 300 and the second area 301 when the user turns the smart phone 12 clockwise 90 degrees to change from the "portrait mode" to the "landscape mode". As above, the first area 300 and the second area 301 set on the screen are changed according to the respective modes. The particular processing procedure is described below.

The data structure of the area information as shown in FIG. 8 stores the area information on the "portrait mode" and the "landscape mode". Using a sensing means (not shown), a posture of the smart phone 12 is detected. The settings of the first area 300 and the second area 301 on the screen are changed in accordance with the detection result. In particular, in the area information referred when performing the determination processing at step S700 (FIG. 7), the settings of the first area 300 and the second area 301 are changed according to the mode corresponding to the detected posture.

This enables to set the first area 300 on the right bottom area of the screen and to set the second area 301 on the left upper area of the screen even when the smart phone is in the "landscape mode", which allows to reduce the occurrence of a malfunction when operated with one hand. Further, the display layout of the GUI object is not largely changed depending on how to hold the smart phone 12, which enables to prevent the user's operability from being lost.

Variation 3

Description was made in a case where the first area 300 and the second area 301 are rectangular-shaped areas. These areas, however, may be formed in other configuration. For example, the finger may move, not only toward the left upper area of the screen but may move toward other positions by greatly stretching the finger to perform the touch operation. Also, in this case, the base of the finger may accidentally touch the screen. Description is made in a case where the second area 301 is set in position, configuration or size which includes areas where the user's tip of the finger is allowed to touch the screen (movement limit position).

Figure 15:
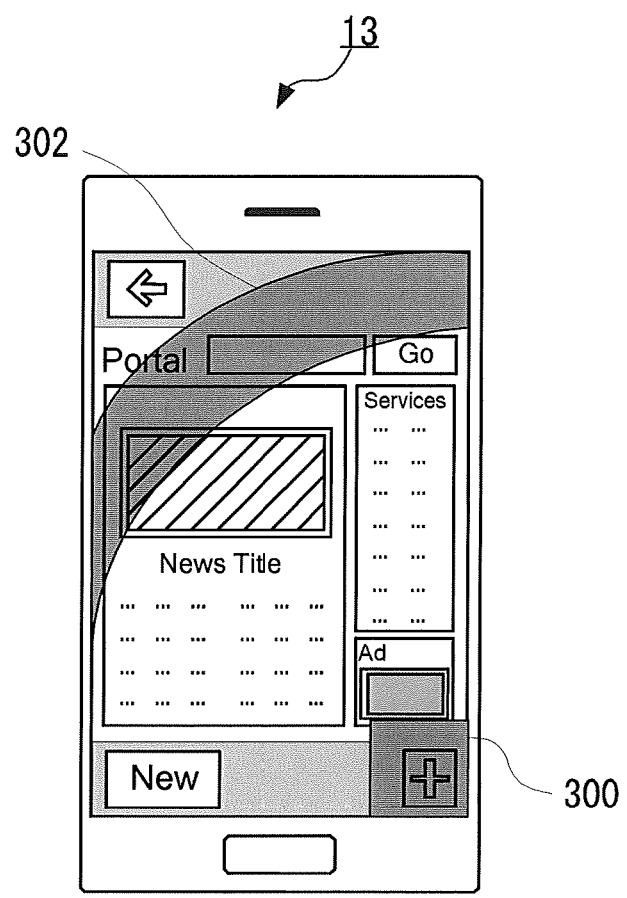
FIG. 15 is a diagram illustrating one example of deformed area set so as to widely include movement limit position of the finger.

FIG. 15 is a diagram illustrating one example of deformed area set so as to widely include the movement limit position of the finger. In the smart phone 13 of FIG. 15, the Web page of a portal site is displayed on the screen and many links are densely located. The user may stretch his finger not only toward the left upper area of the screen but toward the right upper area or the left bottom area of the screen to touch the link. In this case, as shown in FIG. 15, if the second area 301 is spread to set in sartorial shape, it is possible to widely cover the movement limit position of the finger. Further, in the data structure of the area information as shown in FIG. 8, a way of maintaining the coordinate information is changed. In particular, for example, by storing control point information of Bezier curve, area information is stored according to any given curve. Referring to the area information, the determination processing of step S900 (FIG. 9) is executed.

As above, not only a case where the finger is stretched toward the left upper direction, but by widely covering the area user is able to touch the screen with the tip of the finger, the occurrence of a malfunction can be reduced.

Note that the present disclosure may be the information processing method comprising steps of each processing executed in the above-mentioned information processing device. Further, each processing executed in the above-mentioned information processing device may be performed by information processing program executed on a computer. It is possible to spread the information processing program through various storage medium or network, which becomes practicable when installed in computer with storage device.

Each of the embodiments as mentioned above is to particularly describe the present disclosure. The scope of the present disclosure is not limited to these embodiments.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-076841, filed Apr. 2, 2013, which is hereby incorporated by reference herein in its entirety.

What is claimed is:

1. An information processing device configured to be held and be operable with a single hand of a user, the information processing device comprising:
   a processor;
   at least one memory;
   a display unit including a touch screen;
   a setting unit configured to set a first area and a second area on the touch screen, the second area being independent of the first area;
   a sensing unit configured to sense a touch position on the touch screen touched by the user; and
   an invalidation unit configured to invalidate, in a case where the sensing unit senses the touch position in the second area within a predetermined time after the sensing unit sensed the touch position in the first area, an operation identified in accordance with the touch position sensed in the first area so as not to execute the operation in the information processing device,
   wherein the invalidation unit doesn't invalidate, in a case where the sensing unit doesn't sense the touch position in the second area within the predetermined time after the sensing unit sensed the touch position in the first area, the operation identified in accordance with the touch position sensed in the first area,
   wherein at least one of the units is implemented upon executions of instructions stored in the at least one memory.

2. The information processing device according to claim 1, further comprising a storing unit configured to store operation information indicating the operation identified in accordance with the touch position sensed if the sensing unit sensed the touch position in the first area, wherein the invalidation unit is configured to discard the operation information stored in the storing unit if the sensing unit sensed the touch position in the second area within a predetermined time after the sensing unit sensed the touch position in the first area.

3. The information processing device according to claim 1, further comprising a determination unit configured to determine whether or not at least one object is included in the first area, wherein the object being displayed on the touch screen and corresponding to predetermined processing to be triggered by an acceptance of operation from the user, and if it is determined by the determination unit that the object is included in the first area, stores the operation information.

4. The information processing device according to claim 3, wherein the determination unit is configured to determine whether or not at least one object which is different from the object included in the first area is included in the second area; and if it is determined by the determination unit that the object is respectively included in the first area and the second area, the operation information is stored.

5. The information processing device according to claim 1, wherein the setting unit is configured to set a plurality of paired areas on the touch screen, the paired areas being paired by associating the first area with the second area.

6. The information processing device according to claim 1, further comprising a sensor for sensing a posture of the information processing device,
   wherein the setting unit is configured to change respective settings of the first area and the second area in accordance with the posture of the information processing device sensed by the sensor.

7. The information processing device according to claim 1, wherein the second area is set to include areas where a tip of the user's finger is allowed to touch the touch screen.

8. The information processing device according to claim 6, further comprising a sensor for sensing a posture of the information processing device, wherein the first area and the second area are diagonally positioned with respect to a center of the touch screen and wherein the first area is positioned on a downward side of the screen in accordance with the posture of the information processing device sensed.

9. The information processing device according to claim 7, wherein the first area and the second area are diagonally positioned with respect to a center of the touch screen.

10. The information processing device according to claim 1, wherein the user's finger consists of the user's thumb.

11. The information processing device according to claim 1, wherein the information processing device is configured to display GUI objects being operable with a tip of the user's thumb on the touch screen and wherein the setting unit is configured to set the first area and the second area based on the relationship between the touch screen and parts of the user's thumb.

12. The information processing device according to claim 1, wherein the second area is set to include areas where a tip of the user's thumb is allowed to touch the touch screen and the first area being set at a position near to a base of the user's thumb when supporting the information processing device with the single hand.

13. A control method for an information processing device configured to be held and operable with a single hand of a user, the control method comprising:
   setting a first area and a second area on the touch screen, the second area being independent of the first area;
   sensing a touch position on the touch screen touched by the user; and
   invalidating, in a case where the sensing unit sensed the touch position in the second area within a predetermined time after the sensing unit sensed the touch position in the first area, an operation identified in accordance with the position sensed in the first area so as not to execute the operation in the information processing device,
   executing, the operation identified in accordance with the touch position sensed in the first area, in a case where the sensing unit doesn't sense the touch position in the second area within the predetermined time after the sensing unit sensed the touch position in the first area.

14. The control method for an information processing according to claim 13, wherein the user's finger consists of the user's thumb.

15. A non-transitory storage medium storing therein a computer program for operating a computer as an information processing device configured to be held and operable with a single hand of a user for causing the computer to act as following units comprising:
   a setting unit configured to set a first area and a second area on the touch screen, the second area being independent of the first area; and
   a sensing unit configured to sense a touch position on the touch screen touched by the user; and
   an invalidating unit configured to invalidate, if the sensing unit sensed the touch position in the second area within a predetermined time after the sensing unit sensed the touch position in the first area, an operation identified in accordance with the position sensed in the first area so as not to execute the operation in the computer,
   wherein the invalidation unit doesn't invalidate, in a case where the sensing unit doesn't detect the touch position in the second area within the predetermined time after the sensing unit sensed the touch position in the first area, the operation identified in accordance with the touch position sensed in the first area.

16. The storage medium according to claim 15, wherein the user's finger consists of the user's thumb.

* * * * *